(12) United States Patent
Liao (10) Patent No.: US 8,755,766 B2
(45) Date of Patent: Jun. 17, 2014

(54) HANDLING REACHABILITY OF MOBILE DEVICE WHEN SERVING CORE NETWORK NODE CHANGES

(75) Inventor: Ching-Yu Liao, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 223 days.

(21) Appl. No.: 13/419,445

(22) Filed: Mar. 14, 2012

(65) Prior Publication Data

US 2012/0238236 A1 Sep. 20, 2012

Related U.S. Application Data

(60) Provisional application No. 61/452,174, filed on Mar. 14, 2011, provisional application No. 61/475,681, filed on Apr. 15, 2011, provisional application No. 61/483,761, filed on May 9, 2011, provisional application No. 61/542,779, filed on Oct. 3, 2011.

(51) Int. Cl.
*H04M 11/04* (2006.01)

(52) U.S. Cl.
USPC ..................................... 455/404.2

(58) Field of Classification Search
USPC ...................... 455/404.2, 436–448
See application file for complete search history.

(56) References Cited

U.S. PATENT DOCUMENTS

| | | |
|---|---|---|
| 2002/0163906 A1 | 11/2002 | Diachina |
| 2004/0192252 A1 | 9/2004 | Aerrabotu |
| 2005/0119008 A1 | 6/2005 | Haumont |
| 2006/0187933 A1 | 8/2006 | Yi |
| 2009/0305707 A1 | 12/2009 | Pudney |
| 2010/0159991 A1* | 6/2010 | Fu et al. ..................... 455/561 |
| 2010/0240367 A1 | 9/2010 | Lee |
| 2011/0171926 A1 | 7/2011 | Faccin |
| 2011/0201343 A1 | 8/2011 | Pinheiro |
| 2012/0106332 A1 | 5/2012 | Tiwari |

FOREIGN PATENT DOCUMENTS

| | | |
|---|---|---|
| JP | 2005531223 A | 10/2005 |
| WO | 2004002051 | 12/2003 |
| WO | 2011135790 A1 | 11/2011 |

OTHER PUBLICATIONS

Notice of allowance mailed on Jul. 30, 2013 for the Japanese application No. 2011-242743, filing date Nov. 4, 2011, pp. 1-3.

(Continued)

*Primary Examiner* — Joel Ajayi
(74) *Attorney, Agent, or Firm* — Winston Hsu; Scott Margo (57) ABSTRACT

A method of handling reachability of a mobile device in a wireless communication system is disclosed. The method comprises the mobile device establishing a packet data network (PDN) emergency connection when a first back-off timer received from a source core network node is running; the mobile device entering a first tracking area from a second tracking area, wherein the second tracking area is associated with the source core network node, and the first tracking area is associated with a target core network node and not in a tracking area list of the mobile device; and the mobile device sending a remaining time of the first back-off timer or a back-off indicator in a tracking area update (TAU) request message or a TAU complete message to the target core network node, wherein the back-off indicator indicates a back-off status of the mobile device.

13 Claims, 6 Drawing Sheets

(56) References Cited

OTHER PUBLICATIONS

3GPP TS 23.401 V10.1.0 (Sep. 2009) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 10).
3GPP TS 24.301 V10.0.0 (Sep. 2009) Technical Specification 3rd Generation Partnership Project; Technical Specification Group Core Network and Terminals; Non-Access-Stratum (NAS) protocol for Evolved Packet System (EPS); Stage 3 (Release 10).
3GPP TS 24.008 V10.0.0 3rd Generation Partnership Project; Technical Specification Group Core Network and Terminals; Mobile radio interface Layer 3 specification; Core network protocols; Stage 3 (Release 10), Sep. 2010.
3GPP TSG-CT WG1 Meeting #67, C1-104431, Barcelona, Spain, Oct. 11-15, 2010.
3GPP TSG-SA WG2 Meeting #83, S2-111253, Salt Lake City, USA, Feb. 21-25, 2011.
3GPP TSG SA WG2 Meeting #83, S2-111204, Feb. 21-25, 2011, Salt Lake City, Utah, USA.
3GPP TSG-CT WG1 Meeting #70, C1-111522, Salt Lake City, Utah (USA), Feb. 21-25, 2011.
3GPP TSG-CT WG1 Meeting #70, C1-111164, Salt Lake City, Utah (USA), Feb. 21-25, 2011.
3GPP TSG-CT WG1 Meeting #70, C1-110789, Salt Lake City, Utah (USA), Feb. 21-25, 2011.
3GPP TSG-CT WG1 Meeting #70, C1-110788, Salt Lake City, Utah (USA), Feb. 21-25, 2011.
3GPP TSG-CT WG1 Meeting #69, C1-110745, Ljubljana (Slovenia), Jan. 24-28, 2011.
3GPP TSG-CT WG1 Meeting #69, C1-110744, Ljubljana (Slovenia), Jan. 24-28, 2011.
European patent application No. 11008794.7, European Search Report mailing date: Feb. 29, 2012.
ETSI TS 124 008 V9.4.0 (Oct. 2010), "Digital cellular telecommunications system (Phase 2+); Universal Mobile Telecommunications System (UMTS); LTE; Mobile radio interface Layer 3 specification; Core network protocols; Stage 3 (3GPP TS 24.008 version 9.4.0 Release 9)", XP014061450. p. 118 line 22~25 and line 41~42, p. 119 line 10~13 and line 25~28, par. 9.4.14, par.9.4.17, par.9.4.17.1, table 9.4.17 and table 11.3a.
Ericsson, ST-Ericsson, "Evaluation and conclusion of overload congestion control", 3GPP TSG SA WG2 Meeting #79electronic, TD S2-103135, Elbonia, Jul. 6-10, 2010, XP050458220, p. 1-3.
Liao, Title of Invention: Timer Configuration Method, U.S. Appl. No. 13/372,514, filed Feb. 14, 2012.
Liao, Title of Invention: Timer Configuration Method and Related Communication Device, U.S. Appl. No. 13/288,973, filed Nov. 4, 2011.
European patent application No. 12000954.3, European application filing date: Feb. 14, 2012, European Search Report mailing date: Jul. 31, 2012.
ZTE, "Emergency attach during back off duration", 3GPP TSG-CT WG1 Meeting #69, C1-110415, Jan. 24-28, 2011, Ljubljana(Slovenia), XP050479808, pp. 1-3.
HTC Corp., "Handling of periodic TAU timer, mobile reachable timer and MM back-off timer", 3GPP TSG CT WG1 Meeting #69, C1-110181, Jan. 24-28, 2011, Ljubljana(Slovenia), XP050479627, pp. 1-4.
ETSI TS 124 301 V8.8.0 (Jan. 2011), "Universal Mobile Telecommunications System (UMTS); LTE; Non-Access-Stratum (NAS) protocol for Evolved Packet System (EPS); Stage 3 (3GPP TS 24.301 version 8.8.0 Release 8)", XP014061911, coverpage, pp. 1-262.
Notice of Allowance mailed on Dec. 11, 2012 for the U.S. Appl. No. 13/372,514, filed Feb. 14, 2012, p. 1-34.
Office action mailed on Aug. 16, 2013 for the U.S. Appl. No. 13/288,973, filed Nov. 4, 2011, p. 1-26.
3GPP TR23.888 v1.0.0 (Jul. 2010).
Notice of allowance mailed on Apr. 25, 2013 for the Korean application No. 10-2011-0114751, filing date Nov. 4, 2011, pp. 1-2.
Office Action mailed on Jun. 18, 2013 for the Japanese Application No. 2012-029945, filing date Feb. 14, 2012, pp. 1-5.
European patent application No. 12001754.6, European Search Report mailing date: Apr. 18, 2012.
Catt, "UE supports the NAS back-off timer", 3GPP TSG SA WG2 Meeting #81, S2-104878, Oct. 11-15, 2010, Prague, Czech Republic, XP050459666, pp. 1-2.

\* cited by examiner

HANDLING REACHABILITY OF MOBILE DEVICE WHEN SERVING CORE NETWORK NODE CHANGES

CROSS REFERENCE TO RELATED APPLICATIONS

This application claims the benefit of U.S. Provisional Application No. 61/452,174, filed on Mar. 14, 2011 and entitled "Method to handle periodic timer, mobile reachability timer, and MM backoff timer" and the benefit of U.S. Provisional Application No. 61/475,681, filed on Apr. 15, 2011 and entitled "Method to handle periodic timer, mobile reachability timer, and MM backoff timer", and the benefit of U.S. Provisional Application No. 61/483,761, filed on May 9, 2011 and entitled "Method to handle mobile reachable timer for emergency PDN connection during running MM backoff timer", and the benefit of U.S. Provisional Application No. 61/542,779, filed on Oct. 3, 2011 and entitled "Method of handover handling for a back-off UE with emergency PDN connection", the contents of which are incorporated herein in their entirety.

BACKGROUND OF THE INVENTION

1. Field of the Invention

The application relates to a method and a related communication device used in a wireless communication system, and more particularly, to a method of handling an emergency PDN connection in a wireless communication system.

2. Description of the Prior Art

A long-term evolution (LTE) system supporting the 3GPP Rel-8 standard and/or the 3GPP Rel-9 standard is developed by the 3rd Generation Partnership Project (3GPP) as a successor of a universal mobile telecommunications system (UMTS), for further enhancing performance of the UMTS to satisfy users' increasing needs. The LTE system includes a new radio interface and radio network architecture that provides a high data rate, low latency, packet optimization, and improved system capacity and coverage. In the LTE system, a radio access network known as an evolved UTRAN (E-UTRAN) includes multiple evolved NBs (eNBs) for communicating with multiple user equipments (UEs), and communicates with a core network including a mobility management entity (MME), serving gateway, etc for Non Access Stratum (NAS) control. In UMTS system, a Serving GPRS Support Node (SGSN) is responsible for the delivery of data packets to the mobile devices back and forth within its geographical service area, including packet routing and transfer, mobility management (attach/detach and location management), logical link management, and authentication and charging functions. The MME also provides the control plane function for mobility between LTE and 2G/3G access networks with the S3 interface terminating at the MME from the SGSN.

An access point name (APN) is used in the LTE system and the LTE-A system for establishing packet data connections, and is managed by the MME. Further, the APN is used for identifying a packet data network (PDN) or a service type (e.g. multimedia messaging service (MMS)), wherein the PDN or the service type is carried on the packet data connections.

The core network manages the mobile reachability by using mobile reachable timer, paging proceed factor (PPF), and implicit detach timer. The core network supervises the periodic tracking/routing/location area updating procedure of the UE by means of the mobile reachable timer. By default, the mobile reachable timer is set slightly larger than the periodic TAU/RAU/LAU timer. Upon expiry of the mobile reachable timer the network shall clear the PPF flag and start the implicit detach timer. The value of the implicit detach timer is network dependent. Due to the clear of the PPF, the core network cannot page the UE during the period of the implicit detach timer. If the implicit detach timer expires before the UE contacts the network, the network shall implicitly detach the UE. The implicit detach timer shall be stopped when a NAS signaling connection is established for the UE.

NAS level congestion control contains the functions: "APN based congestion control" and "General NAS level Mobility Management control". The use of the APN based congestion control is for avoiding and handling of EMM and ESM signalling congestion associated with UEs with a particular APN. With General NAS level Mobility Management control, the MME may also use the reject of NAS level Mobility Management signaling requests under general congestion conditions.

When the NAS level mobility management congestion control is applied due to network overload or congestion, the MME rejects an attach request, a tracking area update (TAU), a routing area update (RAU) or a service request, and the MME replies the UE with a Mobility Management back-off timer.

When congestion control is active, the MME/SGSN stores the Mobility Management back-off timer and the Session Management back-off timer. Then the MME/SGSN enforces the stored back-off time by immediately rejecting any subsequent request from the UE targeting at connecting to the APN before the stored back-off time is expired.

However, the UE is allowed to initiate a Mobility Management procedure or a Session Management procedure with the APN for a high priority service or an emergency service, even when the Mobility Management back-off timer or the Session Management back-off timer is running. In this situation, since the APN is still in the congestion and has no resource for providing the high priority service or the emergency service, the MME rejects the high priority service or the emergency service, and a delay to access the high priority service or the emergency service is caused. Therefore, disaster may happen due to the delay of the high priority service or the emergency service.

When MME/SGSN performs NAS level congestion control, the MME/SGSN stores a Mobility Management back-off time and a Session Management back-off time. Then the MME/SGSN enforces the stored back-off time by immediately rejecting any subsequent MM/SM request from the UE and allocating a MM/SM back-off timer. However the MME/SGSN does not stores allocated MM/SM back-off timer in the EMM/ESM (EPS Mobility Management, EMM/EPS Session Management, ESM) context per UE basis.

For a normal attached UE, if it gets rejection with a MM back-off timer due to TAU reject or service reject. The UE is normal attached (EMM-Registered state) but enters ECM-IDLE mode when the MM back-off timer is running. When MM back-off timer is running, the back-off UE is still allowed to make emergency call by PDN connection request with request type of emergency to an emergency APN. When the NAS signaling connection is built due to emergency PDN connection request and the UE returns from ECM-IDLE mode to ECM-Connected mode, the network stops the mobile reachable timer.

Considering a UE is rejected by NAS MM requests message with a MM back-off (MMBK) timer, the back-off UE establishes an emergency PDN connections while the MM back-off timer is running. When the back-off UE with non-emergency PDN connection and emergency PDN connection in connected mode moves to a new Tracking area, before handover procedure the back-off UE requests TAU if it enters a new tracking area that is not in the TA list. Since the mobile reachable timer (MRT) is not stored in the MM context and sent to the target MME/SGSN from the source MME/SGSN, the target MME/SGSN does not know how to handle the reachability of the back-off UE and may implicitly detach the back-off UE when the MRT is expired.

SUMMARY OF THE INVENTION

A method of handling reachability of a mobile device in a wireless communication system is provided.

A method of handling reachability of a mobile device in a wireless communication system is disclosed. The method comprises the mobile device establishing a packet data network (PDN) emergency connection when a first back-off timer received from a source core network node is running; the mobile device entering a first tracking area from a second tracking area, wherein the second tracking area is associated with the source core network node, and the first tracking area is associated with a target core network node and not in a tracking area list of the mobile device; and the mobile device sending a remaining time of the first back-off timer or a back-off indicator in a tracking area update (TAU) request message or a TAU complete message to the target core network node, wherein the back-off indicator indicates a back-off status of the mobile device.

A method of handling reachability of a mobile device in a wireless communication system is disclosed, wherein the mobile device establishes an emergency PDN connection when a back-off timer received from a source core network node is running. The method comprises the source core network node sending a remaining time of the back-off timer or a back-off indicator to a target core network node when the target core network node receives a tracking area update (TAU) request message from the mobile device and retrieves information of the mobile device from the source core network node; wherein the back-off indicator indicates a back-off status of the mobile device to the target core network node.

A method of handling reachability of a mobile device in a wireless communication system is disclosed. The method comprises the mobile device establishing a packet data network (PDN) emergency connection when a first back-off timer received from a source core network node is running; the mobile device entering a first tracking area from a second tracking area, wherein the second tracking area is associated with the source core network node, and the first tracking area is associated with a target core network node and not in a tracking area list of the mobile device; the mobile device sending a first tracking area update (TAU) request message to the target core network node in response to entering the first tracking area; and the mobile device stopping the first back-off timer if the first back-off timer is still running and sending a second TAU request message to the target core network node, when the emergency PDN connection is disconnected.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
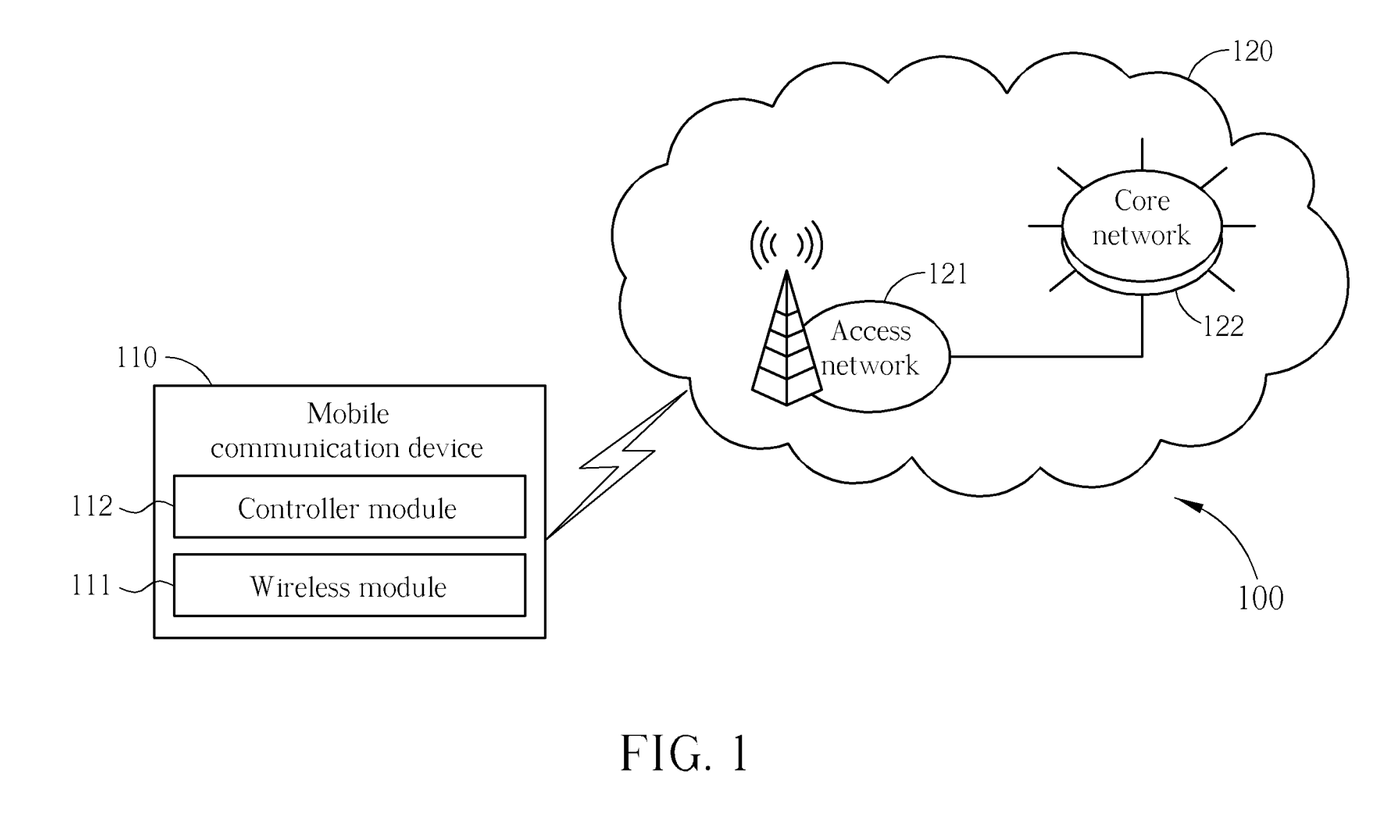
FIG. 1 is a schematic diagram of an exemplary mobile communication environment.

Please refer to FIG. 1, which is a block diagram illustrating a mobile communication environment 100 according to an embodiment of the invention. In the mobile communication environment 100, the mobile communication device 110 is wirelessly connected to the service network 120 for obtaining wireless services. The service network 120 comprises an access network (or called radio access network) 121 and a core network 122. The service network 120 may be a network in compliance with the Global System for Mobile Communication (GSM), Universal Mobile Telecommunications System (UMTS), or Evolved Packet System (EPS) technology. The access network 121 may be a GSM Edge Radio Access Network (GERAN) in the GSM technology, a UMTS Terrestrial Radio Access Network (UTRAN) in the WCDMA/ HSPA technology, or an Evolved-UTRAN (E-UTRAN) in the LTE/LTE-Advanced technology, and the core network 122 may be a GSM core or General Packet Radio Service (GPRS) core in the GSM/UMTS system or an Evolved Packet Core (EPC) in the EPS system. The mobile communication device 110 comprises a wireless module 111 for performing the functionality of wireless transmissions and receptions to and from the service network 120, and a controller module 112 for controlling the operation of the wireless module 111 and other functional components, such as a display unit and/ or keypad serving as the MMI (man-machine interface), a storage unit storing the program codes of applications or communication protocols, or others. Although not shown, a subscriber identity card may be provided to be coupled to the controller module 112, which stores the International Mobile Subscriber Identity (IMSI), the security keys used for identification and authentication with the service networks, and other operation related data acquired during communications with the service networks, such as the Equivalent PLMN list and Forbidden PLMN list, etc. The subscriber identity card may be a Subscriber Identity Module (SIM) card or a Universal SIM (USIM) card.

In the following embodiments, the service network 120 may be a GSM/UMTS/EPS network belonging to a specific PLMN, and the mobile communication device 110 may be a Mobile Station (MS) or User Equipment (UE). The UMTS/ EPS network is in compliance with the 3GPP TS 23.060/TS 23.401 specifications, 3GPP TS 24.008/TS 24.301 specifications, 3GPP TS 23.122 and/or other related UMTS/EPS specifications. Based on the technology used, the messages of Mobility Management (MM) operations may correspond to the GSM/UMTS/EPS technology, respectively, e.g. MM message for Location Area Update, GMM message for Routing Area Update, and EPS Mobility Management (EMM) message for Tracking Area Update. Further, the TAU/RAU procedure may be a combined TA/LA or combined RA/LA procedure in which the TAU/RAU REQUEST message indicates that the mobile communication device 110 wishes to perform TA/RA and LA update for a Packet-Switched domain and a Circuit-Switched (CS) domain, respectively. The Attach procedure may be an ATTACH REQUEST message for a Circuit-Switched domain service in GSM/UMTS system or for Packet-Switched domain service in UMTS/EPS system; further, the Attach procedure may be a combined Attach procedure in which the ATTACH REQUEST message indicates that the mobile communication device 110 wishes to start a packet data session and a Circuit-Switched (CS) domain service with the service network 120 for mobile communication services.

Periodic tracking/routing area updating (TAU/RAU) is used to periodically notify the availability of the mobile communication device 110 to the core network 122. The procedure is controlled in the mobile communication device 110 by the periodic tracking/routing area update timer (timer T3412/T3312). The value of timer T3412/T3312 is sent by the core network 122 to the mobile communication device 110 in the ATTACH ACCEPT message and can be sent in the TRACKING/ROUTING AREA UPDATE ACCEPT message. The mobile communication device 110 shall apply this value in all tracking/routing areas of the list of tracking/routing areas assigned to the mobile communication device 110, until a new value is received. Also the core network 122 may also send extended periodic TAU/RAU timer (T3412ext/T3312ext) which is with longer duration for offloading some signaling load on the core network. If the UE receives T3412ext/T3312ext from ATTACH/TAU/RAUACCEPT message, it applies this value to the T3412/T3312. The two separate timers (timer T3412/T3312) run in the UE for notifying availabilities to core network 122 (e.g. MME/SGSN/MSC, all of which are core network nodes) and updating the core network 122 (MME/SGSN) independently. When APN (access point node) based congestion or general NAS level mobility management congestion happens, the core network 122 (e.g. MME/SGSN) rejects an attach request, a tracking area update (TAU), a routing area update (RAU) or a service request and the core network 122 replies the mobile communication device 110 with a Mobility Management (MM) back-off timer.

When a normal attached mobile communication device 110 (EMM-Registered state) gets rejection with a MM back-off timer due to tracking area update reject or service reject. The mobile communication device 110 is normal attached but enters ECM-IDLE mode when the MM back-off timer is running. When the MM back-off timer is running, the back-off mobile communication device 110 is still allowed to make emergency call by PDN connectivity request with request type of emergency to the core network 122.

Figure 2:
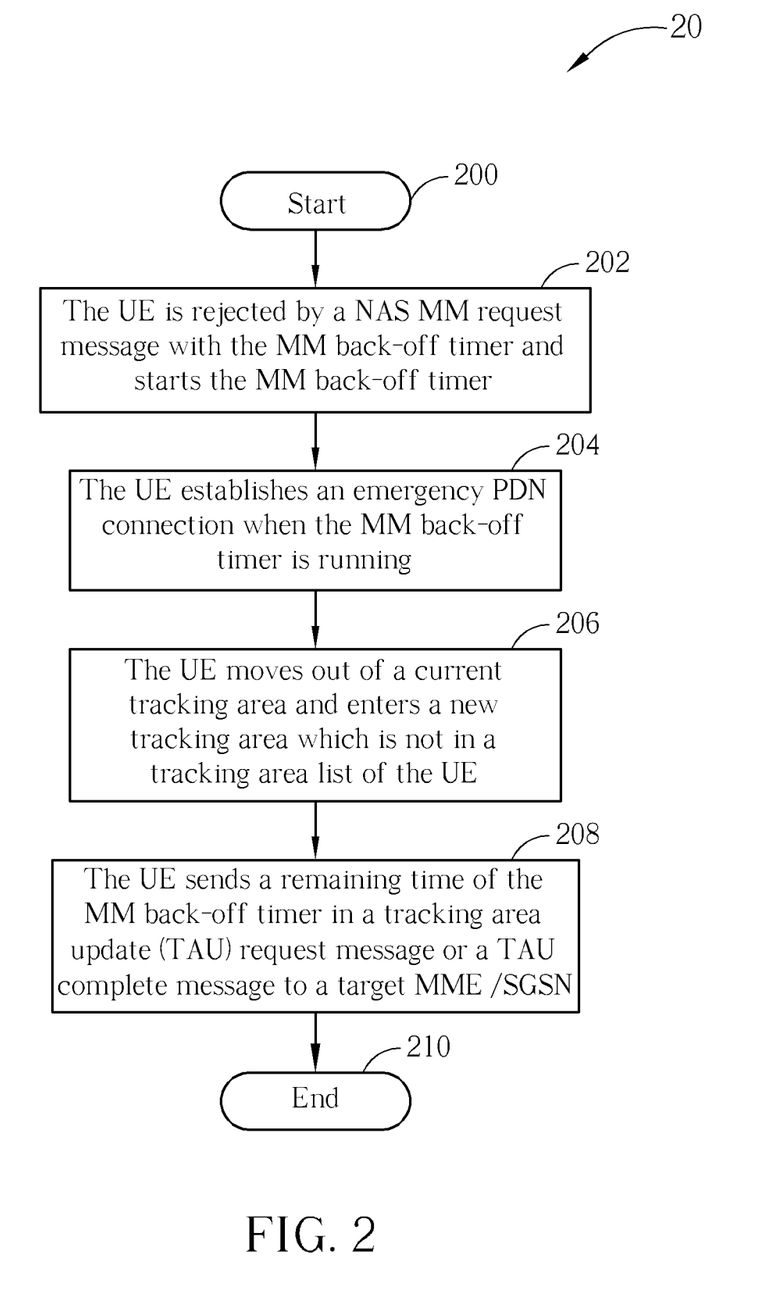
FIGS. 2-6 are flowcharts of exemplary processes.

Please refer to FIG. 2, which is a flow chart of an exemplary process 20. The process 20 is used for handling reachability of a UE. The UE could be the mobile communication device 110 in the mobile communication environment 100. The UE is normal attached and has a MM back-off timer running due to the attach/TAU/service request rejection. The process 20 includes the following steps:

Step 200: Start.
Step 202: The UE is rejected by a NAS MM request message with the MM back-off timer and starts the MM back-off timer.
Step 204: The UE establishes an emergency PDN connection when the MM back-off timer is running.
Step 206: The UE moves out of a current tracking area and enters a new tracking area which is not in a tracking area list of the UE.
Step 208: The UE sends a remaining time of the MM back-off timer in a tracking area update (TAU) request message or a TAU complete message to a target MME/SGSN.
Step 210: End.

According to the process 20, the UE is rejected by the NAS MM rejection message due to the attach/TAU/service request rejection and starts the MM back-off timer. The back-off UE establishes the emergency PDN connection when the MM back-off timer is running. The UE has the emergency PDN connection and at least one non-emergency PDN connection, whereat least the emergency PDN connection is active, i.e. the UE is in connected mode, and moves out of the current tracking area to the new tracking area. The UE sends the TAU request/complete message with the remaining time of the MM back-off timer to the target MME/SGSN when entering the target tracking area which is not in the tracking area list.

Correspondingly, the target MME/SGSN accepts the TAU request/complete message and sets a mobile reachable timer and/or an implicit detach timer based on the received remaining time of the MM back-off timer. By this way, the target MME/SGSN can handle the reachability of the back-off UE properly when the emergency PDN connection is released and the MM back-off timer is still running on the back-off UE.

Figure 3:
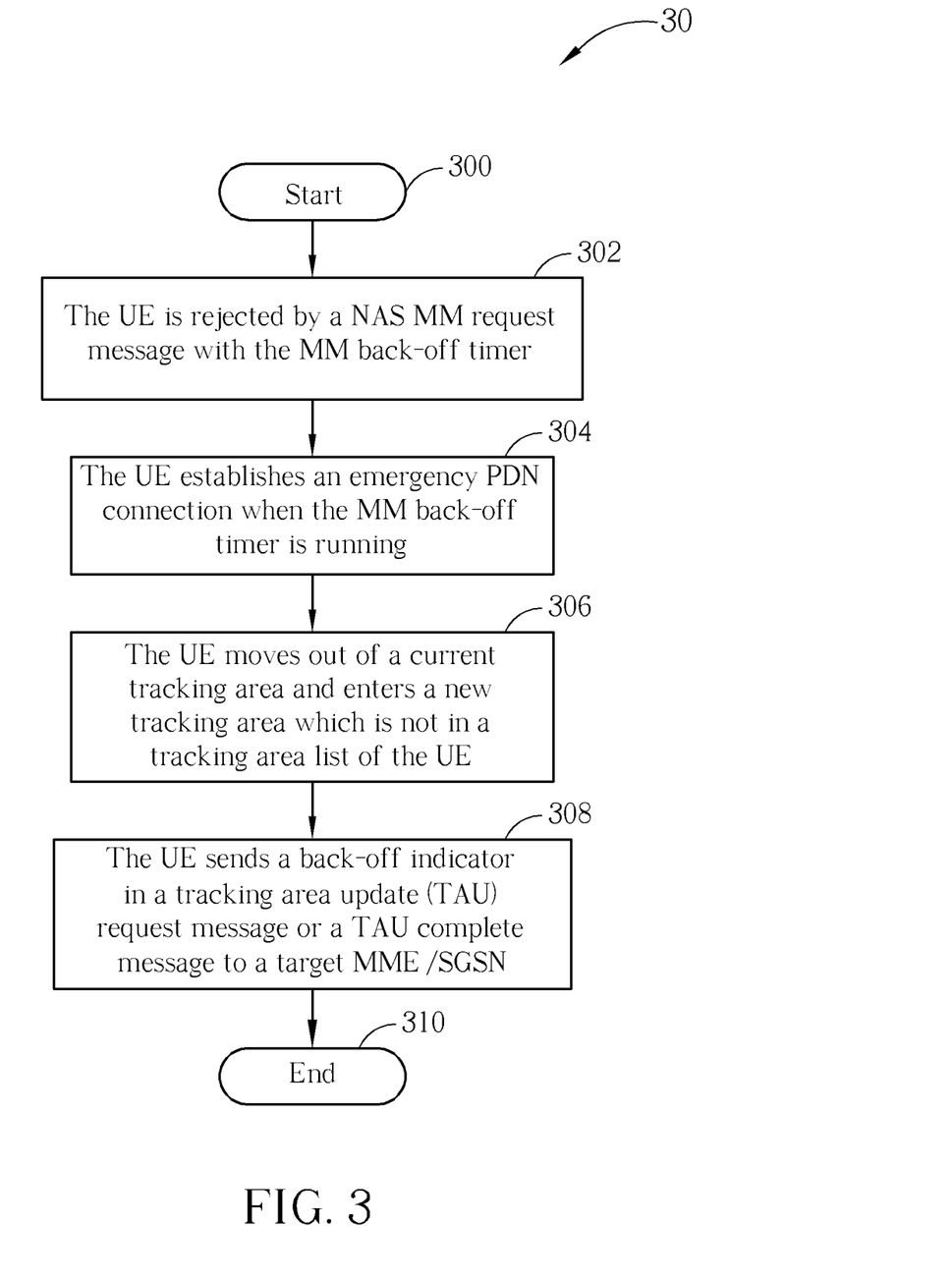

Please refer to FIG. 3, which is a flow chart of an exemplary process 30. The process 30 is used for handling reachability of a UE. The UE could be the mobile communication device 110 in the mobile communication environment 100. The UE is normal attached and has a MM back-off timer running due to the attach/TAU/service request rejection. The process 30 includes the following steps:

Step 300: Start.
Step 302: The UE is rejected by a NAS MM request message with the MM back-off timer.
Step 304: The UE establishes an emergency PDN connection when the MM back-off timer is running.
Step 306: The UE moves out of a current tracking area and enters a new tracking area which is not in a tracking area list of the UE.
Step 308: The UE sends a back-off indicator in a tracking area update (TAU) request message or a TAU complete message to a target MME/SGSN.
Step 310: End.

According to the process 30, the UE is rejected by the NAS MM rejection message due to the attach/TAU/service request rejection and starts the MM back-off timer. The back-off UE establishes the emergency PDN connection when the MM back-off timer is running. The UE has the emergency PDN connection and at least one non-emergency PDN connection, where at least the emergency PDN connection is active, i.e. the UE is in connected mode, and moves out of the current tracking area to the new tracking area. The UE sends the back-off indicator to the target MME/SGSM in the TAU request/complete message when entering the target tracking which is not in the tracking area list. The back-off indicator indicates a back-off status of the UE to the target MME/SGSN.

In some examples of the present disclosure, when the emergency PDN connection is disconnected and the back-off indicator is active (i.e. the MM back-off timer is running on the mobile device), the target MME/SGSN initiates a detach procedure with a re-attach required indication in the Detach type IE to stop the MM back-off timer on the UE if the target MME/SGSN is not congested.

In other examples, when the emergency PDN connection is disconnected and the non-emergency PDN connection is not disconnected but is inactive, the UE stops the MM back-off timer if the MM back-off timer is still running and sends another TAU request to the target MME/SGSN. If the target MME/SGSM is congested, in response to the another TAU request, the target MME/SGSN may send a new MM back-off timer to the UE in the TAU reject message or a new periodic TAU timer with longer duration (e.g. T3412ext) to the UE in the TAU accept message. As result, the target MME/SGSN can handle the mobile reachability properly.

Figure 4:
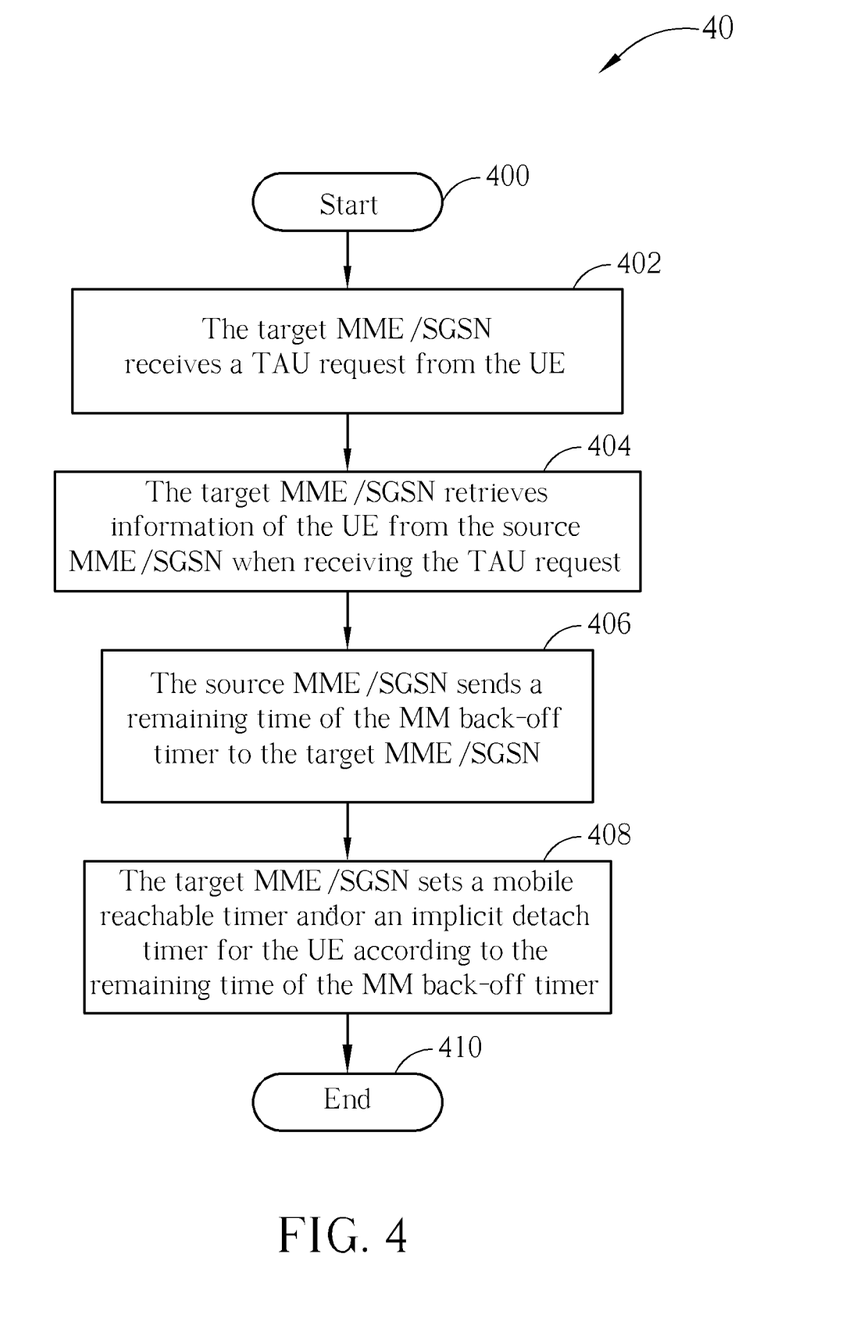

Please refer to FIG. 4, which is a flow chart of an exemplary process 40. The process 40 is used for handling reachability of a UE. The UE could be the mobile communication device 110 in the mobile communication environment 100. The source MME/SGSN and the target MME/SGSN could be the core network 122. The UE is normal attached and has a MM back-off timer running due to the attach/TAU/service request rejection. The process 40 includes the following steps:

Step 400: Start.

Step 402: The target MME/SGSN receives a TAU request from the UE.

Step 404: The target MME/SGSN retrieves information of the UE from the source MME/SGSN when receiving the TAU request.

Step 406: The source MME/SGSN sends a remaining time of the MM back-off timer to the target MME/SGSN.

Step 408: The target MME/SGSN sets a mobile reachable timer and/or an implicit detach timer for the UE according to the remaining time of the MM back-off timer.

Step 410: End.

According to the process 40, the UE is rejected by the NAS MM rejection message due to the attach/TAU/service request rejection and starts the MM back-off timer. The MME/SGSN stores the MM back-off timer. The back-off UE may establish an emergency PDN connection when the MM back-off timer is running. The UE has the emergency PDN connection and at least one non-emergency PDN connection, where at least the emergency PDN connection is active, i.e. the UE is in connected mode. If the UE moves out of the current tracking area and enters a new tracking area which is not in a tracking area list of the UE, the UE sends TAU request to the network. The target MME/SGSN retrieves the information (e.g. mobility management context) of the back-off UE from the source MME/SGSN when the target MME/SGSN receives the TAU request. Then, the source MME/SGSN sends the remaining time of the MM back-off timer to the target MME/SGSN. The target MME/SGSN sets the mobile reachable timer and/or the implicit detach timer for the UE according to the remaining time of the MM back-off timer.

Since the target MME/SGSN receives the remaining time of MM back-off timer from the source MME/SGSN during the TAU procedure for the back-off UE having the emergency PDN connection, the target MME/SGSN can compare the periodic TAU timer with the remaining time of the MM back-off timer and proceed with required handling for the mobile reachability.

Based on the received remaining time of the MM back-off timer, the target MME/SGSN can handle the reachability of the back-off UE properly when the emergency PDN connection is released and the MM back-off timer is still running on the back-off UE.

Figure 5:
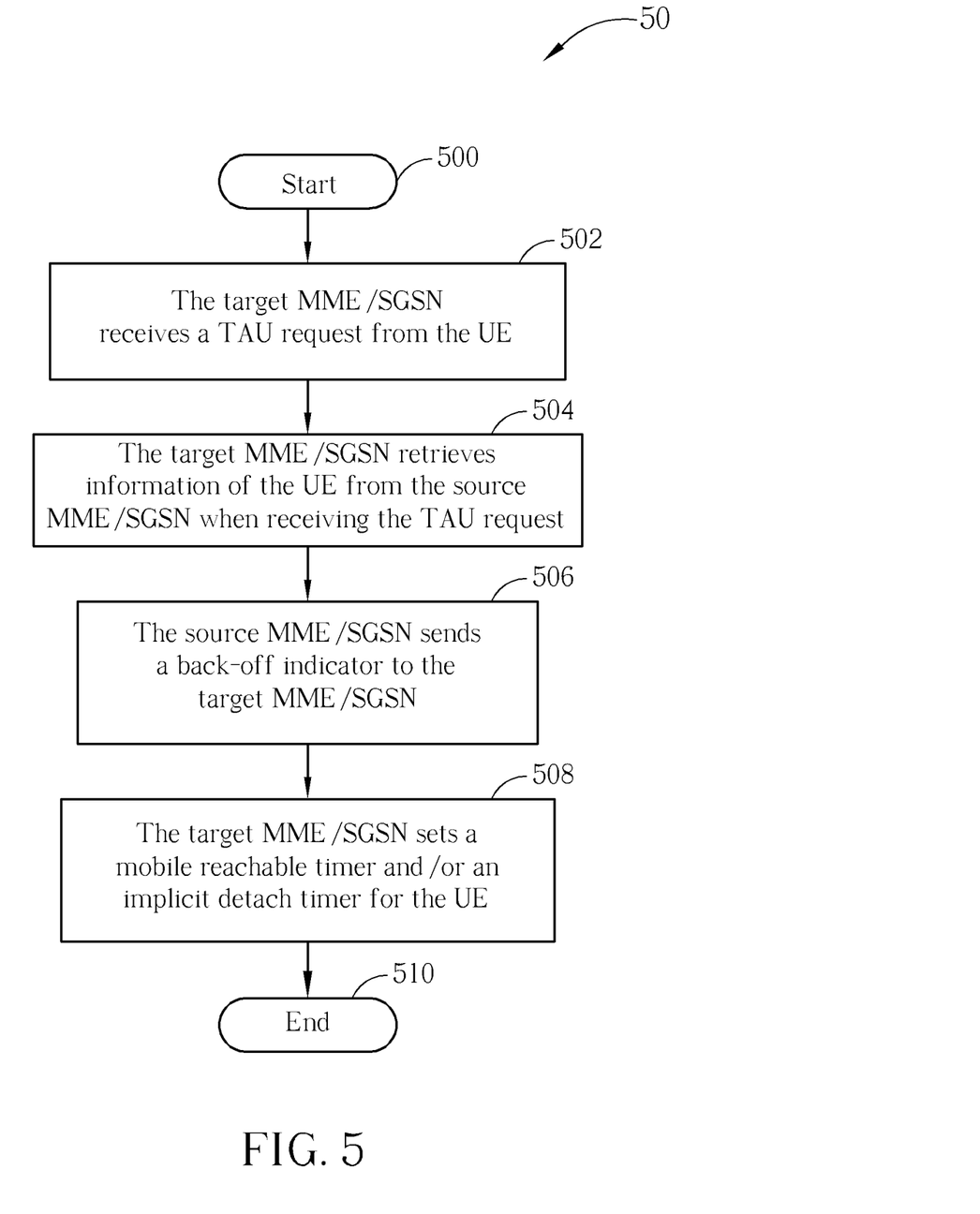

Please refer to FIG. 5, which is a flow chart of an exemplary process 50. The process 50 is used for handling reachability of a UE. The UE could be the mobile communication device 110 in the mobile communication environment 100. The source MME/SGSN and the target MME/SGSN could be the core network 122. The UE is normal attached and has a MM back-off timer running due to the attach/TAU/service request rejection. The process 50 includes the following steps:

Step 500: Start.

Step 502: The target MME/SGSN receives a TAU request from the UE.

Step 504: The target MME/SGSN retrieves information of the UE from the source MME/SGSN when receiving the TAU request.

Step 506: The source MME/SGSN sends a back-off indicator to the target MME/SGSN.

Step 508: The target MME/SGSN sets a mobile reachable timer and/or an implicit detach timer for the UE.

Step 510: End.

According to the process 50, the UE is rejected by the NAS MM rejection message due to the attach/TAU/service request rejection and starts the MM back-off timer. The MME/SGSN sets the back-off indicator for the back-off UE to indicate the back-off status. The back-off UE establishes an emergency PDN connection when the MM back-off timer is running. The UE has the emergency PDN connection and at least one non-emergency PDN connection, where at least the emergency PDN connection is active, i.e. the UE is in connected mode. The UE moves out of the current tracking area and enters a new tracking area which is not in a tracking area list of the UE. The target MME/SGSN retrieves the information (e.g. mobility management context) of the back-off UE from the source MME/SGSN when the target MME/SGSN receives the TAU request. Then, the source MME/SGSN sends the back-off indicator to the target MME/SGSN. The back-off indicator indicates a back-off status of the UE to the target MME/SGSN.

In some examples of the present disclosure, if the back-off indicator is active but the target MME/SGSN is not congested, the target MME/SGSN initiates a detach procedure with a re-attach required indication in the Detach type IE to stop the MM back-off timer on the UE when the emergency PDN connection is disconnected.

In other examples, when the emergency PDN connection is disconnected and the non-emergency PDN connection is not disconnected but is inactive, the UE stops the MM back-off timer if the MM back-off timer is still running and sends another TAU request to the target MME/SGSN. If the target MME/SGSM is congested, in response to the another TAU request, the target MME/SGSN may send a new MM back-off timer to the UE in the TAU reject message or a new periodic TAU timer with longer duration (e.g. T3412ext) to the UE in the TAU accept message. As result, the mobile reachability status can be synchronized between the target MME/SGSN and the UE.

Since the target MME/SGSN receives the back-off indicator from the source MME/SGSN during the TAU procedure for the back-off UE having the emergency PDN connection, the target MME/SGSN can decide how to handle the UE with MM back-off timer running according to the congestion status in the target MME/SGSN.

Figure 6:
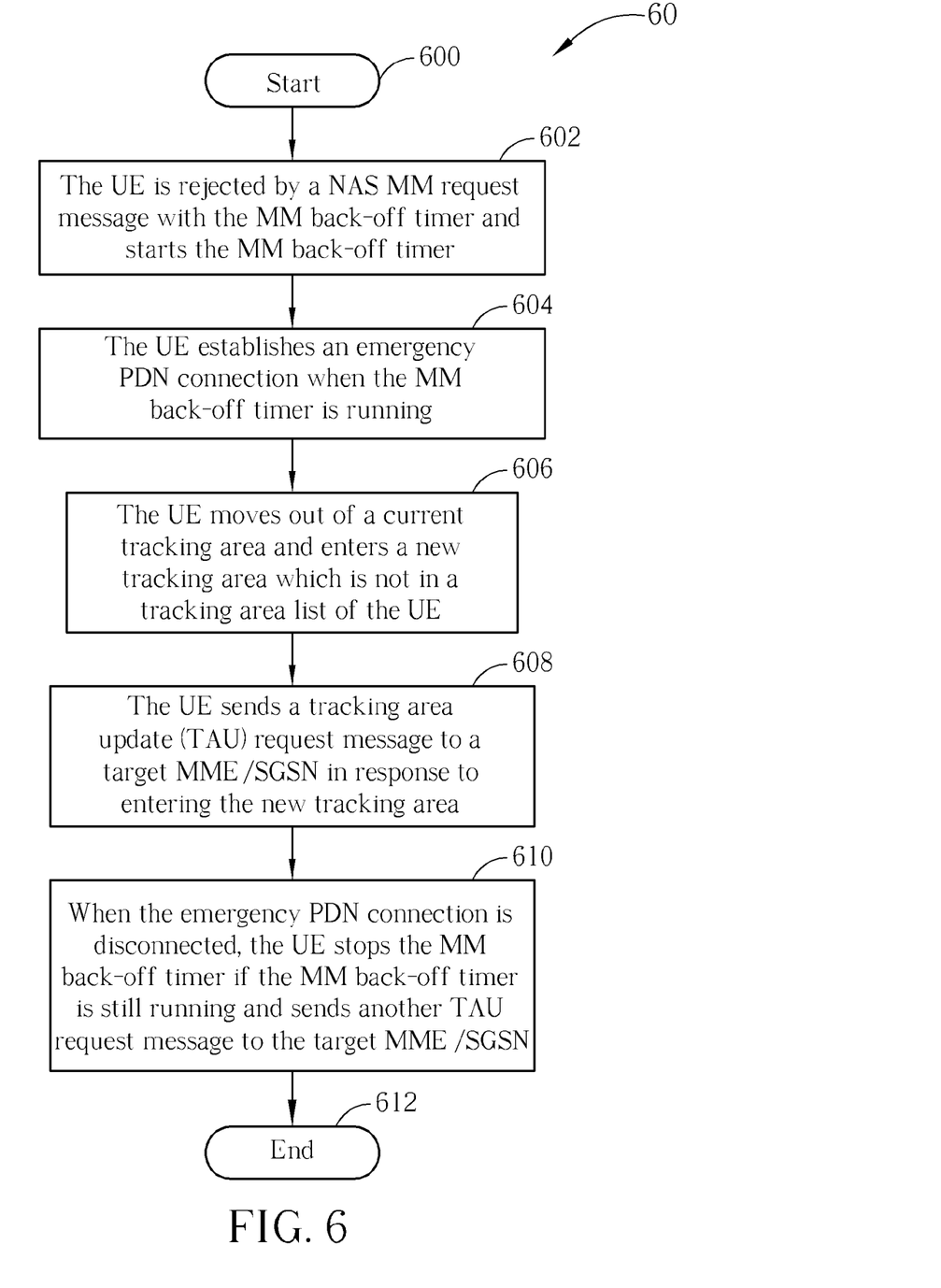

Please refer to FIG. 6, which is a flow chart of an exemplary process 60. The process 60 is used for handling reachability of a UE. The UE could be the mobile communication device 110 in the mobile communication environment 100. The UE is normal attached and has a MM back-off timer running due to the attach/TAU/service request rejection. The process 60 includes the following steps:

Step 600: Start.

Step 602: The UE is rejected by a NAS MM request message with the MM back-off timer and starts the MM back-off timer.

Step 604: The UE establishes an emergency PDN connection when the MM back-off timer is running.

Step 606: The UE moves out of a current tracking area and enters a new tracking area which is not in a tracking area list of the UE.

Step 608: The UE sends a tracking area update (TAU) request message to a target MME/SGSN in response to entering the new tracking area.

Step 610: When the emergency PDN connection is disconnected, the UE stops the MM back-off timer if the MM back-off timer is still running and sends another TAU request message to the target MME/SGSN.

Step 612: End.

In the process 60, the UE is rejected by the NAS MM rejection message due to the attach/TAU/service request rejection. The UE has the emergency PDN connection and at least one non-emergency PDN connection, where at least the emergency PDN connection is active, i.e. the UE is in connected mode, and moves out of the current tracking area to the new tracking area.

In some examples, step 610 is executed when the emergency PDN connection is disconnected and the non-emergency PDN connection is not disconnected but is inactive. Then, if the target MME/SGSM is congested, in response to the TAU request message sent in step 608, the target MME/SGSN may send a new MM back-off timer to the UE in the TAU reject message or a new periodic TAU timer with longer duration (e.g. T3412ext) to the UE in the TAU accept message. As result, the mobile reachability status can be synchronized between the target MME/SGSN and the UE.

To sum up, the normal attached UE has a MM back-off timer running due to the attach/TAU/service request rejection. The back-off UE has an emergency PDN connection and at least one non-emergency PDN connection, where at least the emergency PDN connection is active, i.e. the UE is in connected mode, and moves out of the current tracking area to a new tracking area which is not in the tracking area list of the UE. The UE with the emergency PDN connection and non-emergency PDN connection sends the TAU request/complete message with the remaining time of the MM back-off timer or a back-off indicator to the target MME/SGSN when entering the target tracking area which is not in the tracking area list. In other examples, the source MME/SGSN sends the remaining time of the MM back-off timer or the back-off indicator to the target MME/SGSN when the target MME/SGSN retrieves the user information of the back-off UE from the source MME/SGSN. With the remaining time of the MM back-off timer or the back-off indicator, the target MME/SGSN can handle the reachability of the UE properly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling reachability of a mobile device in a wireless communication system, the method comprising:
    the mobile device establishing an emergency packet data network (PDN) connection when a first back-off timer received from a source core network node is running;
    the mobile device entering a first tracking area from a second tracking area, wherein the second tracking area is associated with the source core network node, and the first tracking area is associated with a target core network node and not in a tracking area list of the mobile device; and
    the mobile device sending one of a remaining time of the first back-off timer, a back-off indicator in a tracking area update (TAU) request message and a TAU complete message to the target core network node, wherein the back-off indicator indicates a back-off status of the mobile device.

2. The method of claim 1 further comprising the target core network node accepting the TAU request message or the TAU complete message and setting at least one of a mobile reachable timer and an implicit detach timer according to the received remaining time of the first back-off timer.

3. The method of claim 1, wherein the first back-off timer is running due to an attach request rejection, TAU request rejection or service rejection from the source core network node.

4. The method of claim 1 further comprising the target core network node initiating a detach procedure with a re-attach required indication in a Detach type information element (IE) according to the back-off indicator, when the emergency PDN connection is disconnected and the target core network node is not congested.

5. The method of claim 1 further comprising the target core network node sending a second back-off timer in a TAU reject message or a periodic TAU timer with long duration in a TAU accept message to the mobile device, when the emergency PDN connection is disconnected and the target core network node is congested and receives a second TAU request message from the mobile device.

6. A method of handling reachability of a mobile device in a wireless communication system,
    a source core network node sending one of a remaining time of a back-off timer and a back-off indicator to a target core network node when the target core network node receives a tracking area update (TAU) request message from the mobile device and retrieves information of the mobile device from the source core network node, wherein an emergency PDN connection is established by the mobile device when the back-off timer received from the source core network node is running;
    wherein the back-off indicator indicates a back-off status of the mobile device to the target core network node.

7. The method of claim 6 further comprising the target core network node setting at least one of a mobile reachable timer and an implicit detach timer for the mobile device according to the remaining time of the back-off timer.

8. The method of claim 6, wherein the back-off timer is running due to an attach request rejection, TAU request rejection or service rejection from the source core network node.

9. The method of claim 6 further comprising the target core network node initiating a detach procedure with a re-attach required indication in a Detach type information element (IE) according to the back-off indicator, when the emergency PDN connection is disconnected and the target core network node is not congested.

10. The method of claim 6 further comprising the target core network node sending a new back-off timer in a TAU reject message or a new periodic TAU timer with long duration in a TAU accept message to the mobile device, when the emergency PDN connection is disconnected and the target core network node is congested and receives a second TAU request message from the mobile device.

11. A method of handling reachability of a mobile device in a wireless communication system, the method comprising:
    the mobile device establishing a packet data network (PDN) emergency connection when a first back-off timer received from a source core network node is running;
    the mobile device entering a first tracking area from a second tracking area, wherein the second tracking area is associated with the source core network node, and the first tracking area is associated with a target core network node and not in a tracking area list of the mobile device;
    the mobile device sending a first tracking area update (TAU) request message to the target core network node in response to entering the first tracking area; and
    the mobile device stopping the first back-off timer when the first back-off timer is still running and sending a second TAU request message to the target core network node, when the emergency PDN connection is disconnected.

12. The method of claim 11, wherein the first back-off timer is running due to an attach request rejection, TAU request rejection or service rejection from the source core network node.

13. The method of claim 11 further comprising in response to the second TAU request message, the target core network node sending a second back-off timer in a TAU reject message or a periodic TAU timer with long duration in a TAU accept message to the mobile device if the target core network node is congested.

\* \* \* \* \*